US010671422B2

(12) United States Patent
Kaplan et al.

(10) Patent No.: US 10,671,422 B2
(45) Date of Patent: Jun. 2, 2020

(54) MONITORING OF MEMORY PAGE TRANSITIONS BETWEEN A HYPERVISOR AND A VIRTUAL MACHINE

(71) Applicant: Advanced Micro Devices, Inc., Sunnyvale, CA (US)

(72) Inventors: David Kaplan, Austin, TX (US); Jeremy W. Powell, Austin, TX (US); Richard Relph, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 163 days.

(21) Appl. No.: 15/685,861

(22) Filed: Aug. 24, 2017

(65) Prior Publication Data

US 2018/0285140 A1    Oct. 4, 2018

Related U.S. Application Data

(60) Provisional application No. 62/478,148, filed on Mar. 29, 2017.

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| 8,631,212 | B2 | 1/2014 | Kegel et al. |
| 9,536,088 | B1 | 1/2017 | Igotti et al. |
| 2013/0339568 | A1* | 12/2013 | Corrie ................ G06F 12/023 711/6 |
| 2015/0199209 | A1 | 7/2015 | Tsirkin |
| 2016/0232020 | A1 | 8/2016 | Tsirkin |
| 2017/0004001 | A1 | 1/2017 | Bacher et al. |
| 2017/0357592 | A1* | 12/2017 | Tarasuk-Levin .... G06F 12/1009 |

OTHER PUBLICATIONS

International Search Report and Written Opinion dated Dec. 27, 2017 for PCT/US2017/048471, 11 pages.
International Preliminary Report on Patentability dated Oct. 10, 2019 for International Application No. PCT/US2017/04847, 8 pages.

* cited by examiner

*Primary Examiner* — Diem K Cao

(57) ABSTRACT

A security module in a memory access path of a processor of a processing system protects secure information by verifying the contents of memory pages as they transition between one or more virtual machines (VMs) executing at the processor and a hypervisor that provides an interface between the VMs and the processing system's hardware. The security module of the processor is employed to monitor memory pages as they transition between one or more VMs and a hypervisor so that memory pages that have been altered by a hypervisor or other VM cannot be returned to the VM from which they were transitioned.

25 Claims, 6 Drawing Sheets

MONITORING OF MEMORY PAGE TRANSITIONS BETWEEN A HYPERVISOR AND A VIRTUAL MACHINE

CROSS-REFERENCE TO RELATED APPLICATIONS

The present application is related to and claims priority to the following application, the entirety of which is incorporated by reference herein: U.S. Provisional Patent Application Ser. No. 62/478,148, entitled "PSP/HV Flows with SNP", filed Mar. 29, 2017.

BACKGROUND

In many processor applications, security of information is an important feature. For example, a processor can be used in a server in an Infrastructure As A Service (IAAS) environment, wherein the processor executes one or more virtual machines (VMs) and executes a hypervisor to partition the server hardware among the VMs and to isolate the VMs from each other. Different VMs may be executed on behalf of different customers, so it is desirable that the information (instructions and data) employed by each VM be protected from access by other VMs and by the hypervisor. However, flaws (e.g., bugs) in the hypervisor can cause the hypervisor itself to be vulnerable to exploitation, allowing the hypervisor or a VM to access the information of another VM.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for protecting secure information at a processor of a processing system by employing a security module in the processor's memory access path to verify the contents of memory pages as they transition between one or more virtual machines (VMs) executing at a processor of the processing system and a hypervisor that provides an interface between the VMs and the processing system's hardware. The hypervisor is used to isolate the VMs by assigning each VM a dedicated portion of memory divided into contiguous blocks referred to as memory pages and other resources of the processing system for its private use. In some embodiments, the hypervisor may request that a VM transition a subset of its dedicated portion of memory back to the hypervisor if, for example, the hypervisor is low on memory. The hypervisor may later return the subset of memory to the VM, for example, in response to a request by the VM for the subset of memory. However, bugs in the hypervisor, or a hypervisor that has been maliciously modified to act as a vehicle for exploitation, can allow the hypervisor or another VM to examine, or even alter, the information of in the subset of memory. Using the techniques described herein, the security module of the processor is employed to monitor memory pages as they transition between one or more VMs and a hypervisor so that memory pages that have been altered by a hypervisor or other VM cannot be returned to the VM from which they were transitioned.

In some embodiments, when the hypervisor allocates a portion of memory to a VM, a subset of the allocated portion of memory is secured, e.g., encrypted, and the remainder of the allocated portion of memory (for example, memory that is not anticipated to be used by the VM during a period of time, referred to herein as "excess memory") is left in an unencrypted form, e.g., at a balloon pool. Excess memory pages have not been written to by the VM, and therefore there is not a security risk that information stored by the VM at excess memory pages could be compromised by the hypervisor. Therefore, if excess memory pages are available, the hypervisor can use and return the excess memory pages without the security module monitoring the excess memory pages. By bypassing the monitoring by the security module, the hypervisor can make use of excess memory pages more efficiently than it can use secured memory pages allocated to the VM.

Figure 1:
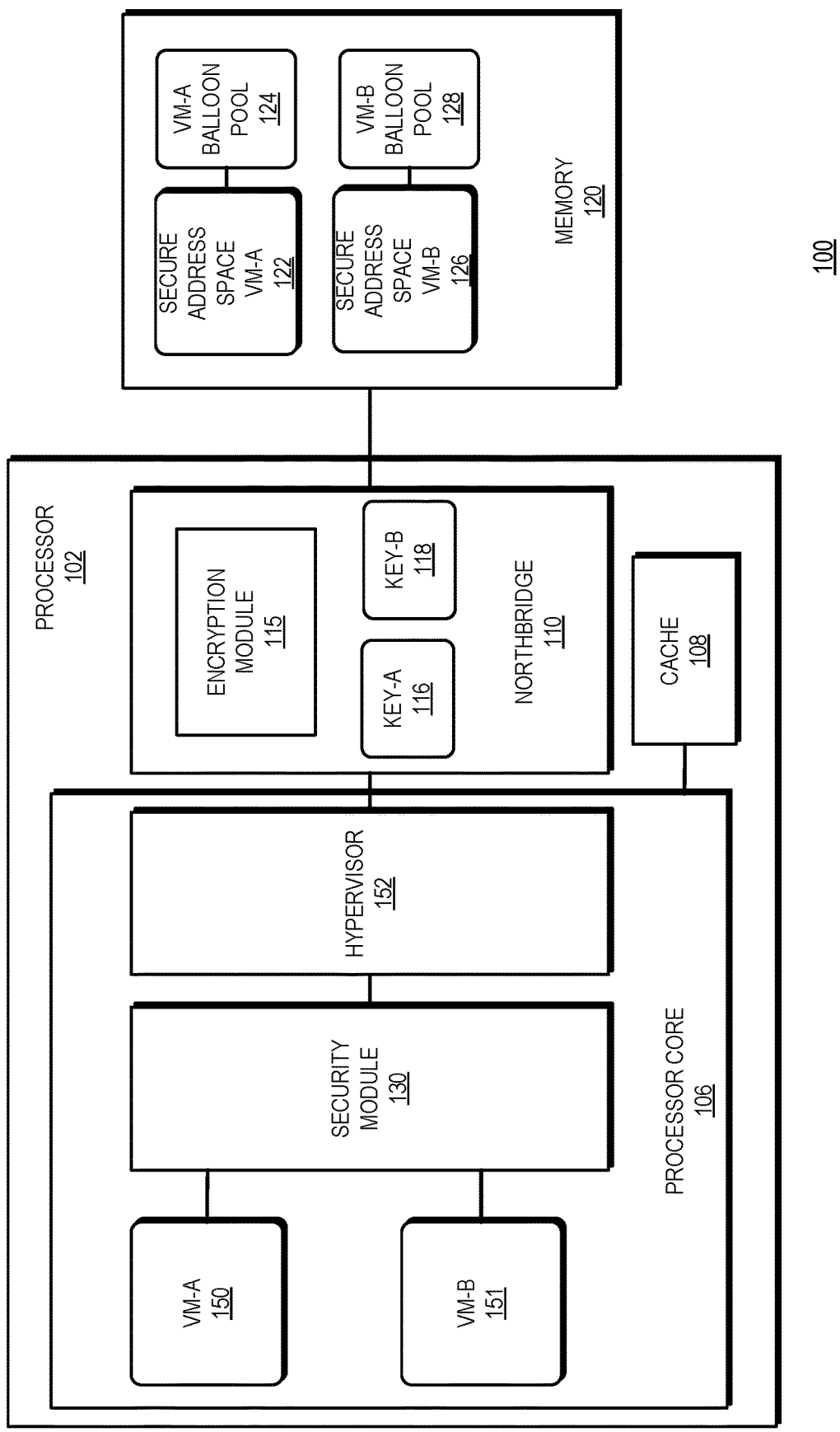
FIG. 1 is a block diagram of a processing system employing a security module in conjunction with a hypervisor to verify the contents of memory pages that transition between a VM and the hypervisor in accordance with some embodiments.

FIG. 1 illustrates a processing system 100 that supports monitoring of memory pages that transition between a VM and a hypervisor in accordance with some embodiments. The processing system 100 includes a processor 102 and a memory 120. The processing system 100 can be incorporated in any of a variety of electronic devices, such as a server, personal computer, tablet, set top box, gaming system, and the like. The processor 102 is generally configured to execute sets of instructions (e.g. computer programs) that manipulate the circuitry of the processor 102 to carry out defined tasks. The memory 120 facilitates the execution of these tasks by storing data used by the processor 102. The memory 120 can be random access memory (RAM), non-volatile memory such as flash memory or a hard disk drive (HDD), and the like, or a combination thereof.

In the course of executing the sets of instructions, the processor 102 generates memory access requests, including write requests to store data at the memory 120 and read requests to retrieve data from the memory 120. Each memory access request includes a memory address (e.g. a system physical address) indicating a location at the memory 120 targeted by the memory access request. In response to a read request, the memory 120 retrieves information (data or instructions) stored at the location corresponding to the memory address of the read request and provides the information to the processor 102. In response to a write request, the memory 120 stores write information of the request at the location corresponding to the memory address of the write request.

The processor 102 includes an encryption module 115. The encryption module 115 is a general purpose processor, field programmable gate array (FPGA), application specific integrated circuit (ASIC), mode of operation of a processor core, or other module designed and configured to perform security operations for the processing system 100, including registration of entities (e.g. virtual machines, computer programs, and the like) to be executed at the processor 102, generation and identification of security keys for the entities to be executed, authentication of the processing system 100 for security operations, and the like. As described further herein, the encryption module 115 supports the cryptographic isolation of information at the processing system 100 by generating the security keys, identifying the entities registered to be executed at the processing system 100, and other operations that enable such cryptographic isolation.

To facilitate execution of instructions, the processor 102 includes one or more processor cores 106, caches 108, a northbridge 110, and a security module 130. Although only a single processor core 106 is depicted in FIG. 1, the processing system 100 may include multiple processor cores. The processor cores 106 are processing units that individually and concurrently execute instructions. In some embodiments, each of the processor cores 106 includes an individual instruction pipeline that fetches instructions, decodes the fetched instructions into corresponding operations and, using the resources of the processing system 100, executes the operations, including memory access requests. Each of the processor cores 106 is configured to identify each memory access request as one of two types: a secure memory access request, indicating that the information corresponding to the memory access request is designated for cryptographic protection, or a non-secure memory access request, indicating that the information corresponding to the memory access request is not designated for cryptographic protection.

In some embodiments, the processing system 100 implements a security scheme whereby the security designation for information (whether the information is to be cryptographically protected) is assigned based on control bits included with the memory address corresponding to where the information is stored at the memory 120 or corresponding to the type of information (e.g. instructions or data). This allows large collections of data to be easily classified as secured information, providing for efficient information protection. For example, in some embodiments, the control bits are set by the processing system 100 so that particular types of information, such as instruction information, or page table information that provides a mapping of virtual addresses to physical addresses of the memory 120, are designated as secured information, thereby cryptographically protecting this information as described further below. The control bits for addresses assigned to data can be designated in a more fine-grained fashion based on, for example, designations requested by programs executing at the processor 102. This security scheme provides for protection of crucial data (preventing, for example, unauthorized execution of a virtual machine or its programs) while still providing flexibility for more general data.

In some embodiments, because the security type assigned to information is designated based on the information's corresponding memory address, the processing system 100 uses the page tables themselves to indicate the security type for each memory address. Accordingly, the processor core 106 identifies the type of memory access request in the course of identifying the memory address corresponding to the memory access request. In particular, if the memory address is indicated as storing secured information, the corresponding memory access is identified as a secure memory access. Similarly, if the memory address is indicated as storing non-secured information, the corresponding memory access is identified as a non-secure memory access.

The caches 108 are memory devices that store subsets of the information stored at the memory 120, thereby providing the processor cores 106 quick access to the respective information subset. Although only a single cache 108 is depicted in FIG. 1, it will be appreciated that the processing system 100 may include multiple caches, including different caches residing at different levels of a memory hierarchy of the processor 102. The cache 108 receives memory access requests and identifies whether its storage array (not shown at FIG. 1) stores information targeted by the memory access request. If so, the cache 108 indicates a cache hit and satisfies the memory access request at the storage array. If the cache 108 does not store the targeted information, it indicates a cache miss and provides the memory access request to the northbridge 110.

In the illustrated example of FIG. 1, the memory access path of the processing system 100 is such that the cache 108 stores information, including secure information, in an unencrypted form. Accordingly, in some embodiments the cache 108 stores, for each storage location of a given size (e.g., a cache line), entity tag information identifying a particular program or other entity (e.g., a VM) that is authorized to access the information at the storage location. In response to a memory access to a location of the storage array, the cache 108 compares the identity of the entity that generated the memory access request to the entity tag information and, in response to a mismatch, indicates a cache miss, thereby preventing unauthorized access to the information.

The northbridge 110 is a memory controller that provides an interface for the processor 102 to communicate with the memory 120. In some embodiments, the northbridge 110 can perform other functions, such as interfacing with an input/output controller (e.g., a southbridge, not shown), and providing an interface between different processor cores 106. In its capacity as a memory controller, the northbridge 110 receives memory access requests from the cache 108 and controls provision of those requests to the memory 120. In addition, the northbridge 110 receives responses to memory access requests from the memory 120 and controls provision of the responses to the cache 108. In some embodiments, the northbridge 110 can receive memory access requests (e.g., direct memory access requests) from input/output devices (not shown) of the processing system 100 and controls their provision to the memory 120.

To provide for cryptographic isolation of information, the northbridge 110 includes an encryption module 115 configured to encrypt and decrypt information according to a specified cryptographic standard, and based on keys 116, 118. In some embodiments, the encryption module 115 is configured to employ Advanced Encryption Standard (AES) encryption and decryption, but in other embodiments the encryption module 115 may employ other encryption/decryption techniques. In response to receiving a write request, the northbridge 110 identifies whether the request is a secure memory access request or a non-secure memory access request. If the write request is a non-secure memory access request, the northbridge 110 bypasses the encryption module 115 and provides the write request to the memory 120 without encrypting the information to be written. If the write request is a secure memory access request, the northbridge 110 identifies one of the keys 116, 118 that is assigned to the entity (e.g., program, VM, software service, and the like) that generated the memory access request. In some embodiments, the security module 130 identifies the key to be selected based on which entity is currently being executed at the processor 102. The encryption module 115 employs the selected key to encrypt the information to be written and provides the write request, with the encrypted information, to the memory 120 for storage. In some embodiments, the encryption module 115 uses both the selected key and the physical address of the memory access request for encryption and decryption of the corresponding information thereby preventing block move attacks. In some embodiments, the encryption module 115 identifies whether to use the physical address for encryption and decryption based on the state of a control bit (not shown) at the processor 102. The control bit state can be set by the security module 130.

In response to receiving a read request, the northbridge 110 provides the request to the memory 120 and subsequently receives the information responsive to the request. If the northbridge 110 identifies the read request as a non-secure memory access request, it bypasses the encryption module 115 and provides the read information to the cache 108 without encryption. If the northbridge 110 identifies the read request as a secure memory access request, it identifies one of the keys 116, 118 that is assigned to the entity that generated the read access request and the encryption module 115 decrypts the read information. The northbridge 110 provides the decrypted read information to the cache 108 for storage. In some circumstances, the northbridge 110 may bypass provision of information to the cache 108 and provide the decrypted read information directly to the processor core that generated the corresponding read access request.

The hypervisor 152 is configured to isolate the VMs (VM-A 150, VM-B 151) by assigning each VM a dedicated portion of memory and other resources of the processing system for its private use. Each VM 150, 151 provides a secure and isolated hardware-emulation environment for one or more virtual processors, whereby each virtual processor executes a corresponding guest operating system (OS) (not shown). Each guest OS/virtual processor, as well as the hypervisor 152, has an associated address space. Each guest OS typically is identified using a particular identifier, referred to herein as a "WorldID", and the lower-level address spaces managed by the guest OS are identified using particular identifiers that are referred to herein as "address space identifiers" or "ASIDs".

The address space assigned to each VM may be designated to store secure information (e.g., secure address space VM-A 122, secure address space VM-B 126). In some embodiments, the address space assigned to each VM may also include excess memory that is not designated for secure information, and is held in a balloon pool (e.g., VM-A balloon pool 124, VM-B balloon pool 128). The balloon pools 124, 128 are physical or virtual memory address spaces that hold excess memory assigned to a VM that is either not anticipated to be written to by the corresponding VM in a given time period, or that is considered less valuable by the corresponding VM. In some embodiments, the hypervisor 152 may request that a VM transition a subset of its dedicated portion of memory back to the hypervisor 152 if, for example, the hypervisor 152 itself or another VM requires additional memory. The hypervisor 152 may later return the subset of memory to the VM, for example, in response to a request by the VM for the subset of memory.

To facilitate the secure transition of memory between the hypervisor 152 and the VMs 150, 151, the security module 130 is configured to selectively monitor memory pages as they transition between the hypervisor 152 and the VMs 150, 151. At launch of a VM, the hypervisor 152 allocates memory to the VMs 150, 151, designating the physical address and ASID for each VM's allocated memory. In some embodiments, the hypervisor 152 maintains a log (not shown) indicating the physical address and ASID for each VM's allocated memory. The hypervisor 152 additionally designates the allocated memory as immutable. In some embodiments, the hypervisor 152 designates the allocated memory as immutable by setting an immutable bit associated with the allocated memory that is stored at the log. After the hypervisor 152 allocates memory to the VMs 150, 151, the hypervisor 152 signals the encryption module 115 to encrypt—and the security module 130 to measure—data and instructions that each VM 150, 151 stores at its respective allocated memory 122, 126. In some embodiments, the security module 130 generates and stores an offline encryption key when the VM is launched, which is a random key that is unique to each VM. In some embodiments, after the data stored at each VM's allocated memory has been encrypted by the encryption module 115 and measured by the security module 130, the security module 130 indicates that the memory at which the encrypted and measured data is stored has been validated, for example, by setting a validated bit associated with the memory at the log maintained by the hypervisor 152, and clears the immutable bit. The validation indication signals to the VM that the VM may write to the memory at which the encrypted and measured data is stored.

If the hypervisor 152 requests that a VM 150, 151 transition ("swap out", or move between DRAM and another storage medium, such as a disk) one or more memory pages from the VM's domain of secured pages of address space 122, 126 to the hypervisor 152, the security module 130 measures the characteristics, including a hash of the one or more memory pages that are to be swapped out, such as the physical memory address range(s) of the memory pages, plaintext of the one or more memory pages, a nonce, and meta-data associated with the one or more memory pages. The security module 130 stores the measurement, and provides the requested one or more memory pages to the hypervisor 152. In some embodiments, the hypervisor 152 also stores the measured characteristics, such as physical memory address range(s) of the memory pages, ciphertext of the one or more memory pages, nonce, and meta-data associated with the one or more memory pages.

When the hypervisor 152 subsequently signals that it is ready to return ("swap in", or bring the page back into DRAM) the one or more memory pages to the VM 150, 151 from which the hypervisor 152 transitioned the memory pages, the hypervisor 152 supplies the stored measured characteristics to the security module 130. The security module 130 retrieves the stored hash of the one or more memory pages and compares the measured characteristics of the swapped-out memory pages to the characteristics of the one or more memory pages that the hypervisor 152 is swapping in. If the measured characteristics of the swapped-out memory pages match the characteristics of the swapped in memory pages, the security module 130 allows the hypervisor 152 to return the memory pages to the VM 150, 151. If the measured characteristics of the swapped-out memory pages do not match the characteristics of the returned memory pages, the security module 130 prevents the hypervisor 152 from returning the memory pages to the VM 150, 151. In this way, the security module 130 prevents the hypervisor 152 from swapping in modified memory pages to the VM 150, 151.

In some embodiments, if the hypervisor 152 requests that a VM 150, 151 swap out one or more memory pages from its balloon pool 124, 128 to the hypervisor 152, the security module 130 bypasses measuring characteristics of the memory pages and allows the hypervisor 152 to swap out the memory pages directly from the balloon pool 124, 128 to the hypervisor 152 without security monitoring. Because the memory pages stored at the balloon pools 124, 128 are excess unused or less valuable memory, such memory pages do not require verification of their contents by the security module 130.

Figure 2:
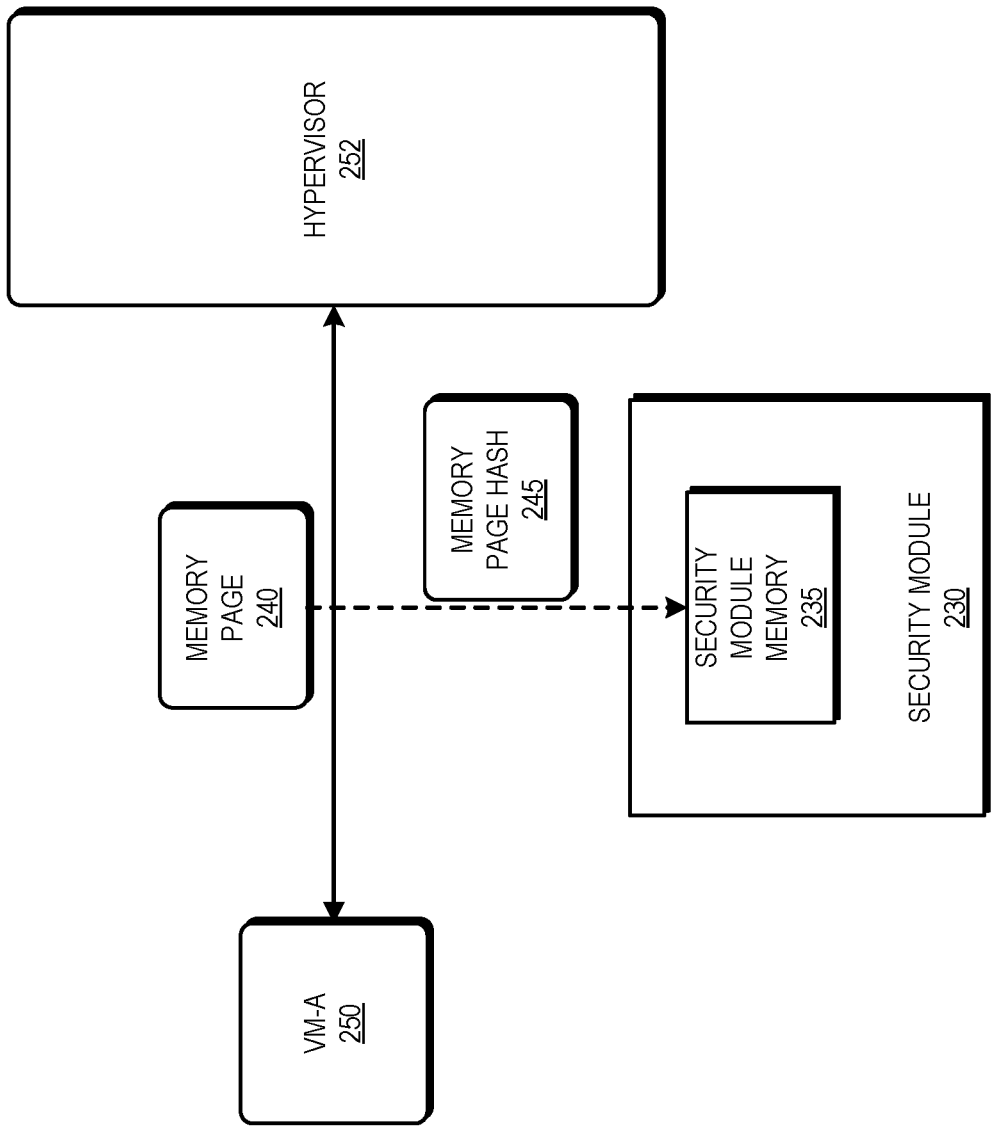
FIG. 2 is a block diagram illustrating an example of a security module of the processing system of FIG. 1 generating and storing a hash of a memory page that transitions between a VM and the hypervisor in accordance with some embodiments.

FIG. 2 illustrates, in accordance with some embodiments, an example of a security module 230 of the processing system 100 of FIG. 1 generating and storing a hash 245 of a memory page 240 that transitions between a VM 250 and the hypervisor 252. In the depicted example, the hypervisor 252 requests a portion of the memory allocated to VM-A 250. The security module 230 verifies the contents of the memory page 240 as it transitions between VM-A 250 and the hypervisor 252. The security module 230 includes security module memory 235, which is configured to store measured characteristics of memory pages that are swapped in and out by the hypervisor 252.

In operation, the hypervisor 252 requests additional memory 240 from the VM-A 250. Upon receiving the request from the hypervisor 252, the security module 230 verifies that the one or more requested memory pages 240 are validated and allocated to the VM-A 250. In some embodiments, the security module 230 reads and decrypts the page data stored at the memory pages 240, generates a nonce, and re-encrypts the page data using the offline encryption key (not shown) that was generated when the VM was launched. The security module 230 measures characteristics of the memory page 240 (referred to as a memory page hash) 245, and stores the memory page hash 245 at the security module memory 235 in a list of page swaps (not shown) for the VM-A 250. In some embodiments, the memory page hash 245 is a hash of the nonce, re-encrypted data, and page meta-data. In some embodiments, the security module 230 marks the swapped-out memory pages 240 as "not valid" or "invalid" in the log (not shown) maintained by the hypervisor 252 indicating allocations of memory to VMs. By marking the swapped-out memory page 240 as invalid, the security module 230 indicates to the VM-A 250 that the swapped-out memory pages are not available for the VM-A 250 to write to. This prevents the hypervisor 252 (or another VM to which the hypervisor 252 allocates the swapped-out memory pages) and the VM-A 250 from writing simultaneously to the same memory page. In some embodiments, the security module 230 provides the re-encrypted data, the nonce, the page meta-data, and the hash for the memory page 240 to the hypervisor 252, and provides the memory page 240 to the hypervisor 252.

When the hypervisor 252 subsequently requests to swap in the memory page 240, the hypervisor 252 provides the re-encrypted data, the nonce, the page meta-data, and the hash for the memory page 240 to the security module 230. The security module 230 calculates a hash of the re-encrypted data, nonce, and page meta-data supplied by the hypervisor 252 of the swapped-in memory page 240 and compares the calculated hash to the stored hash 245. If the calculated hash and the stored hash 245 do not match, the security module 230 rejects the request to swap in the memory page 240. If the calculated hash and the stored hash 245 match, the security module 230 permits the hypervisor 252 to swap in the memory page 240, and returns the memory page 240 to the VM-A 250.

Figure 3:
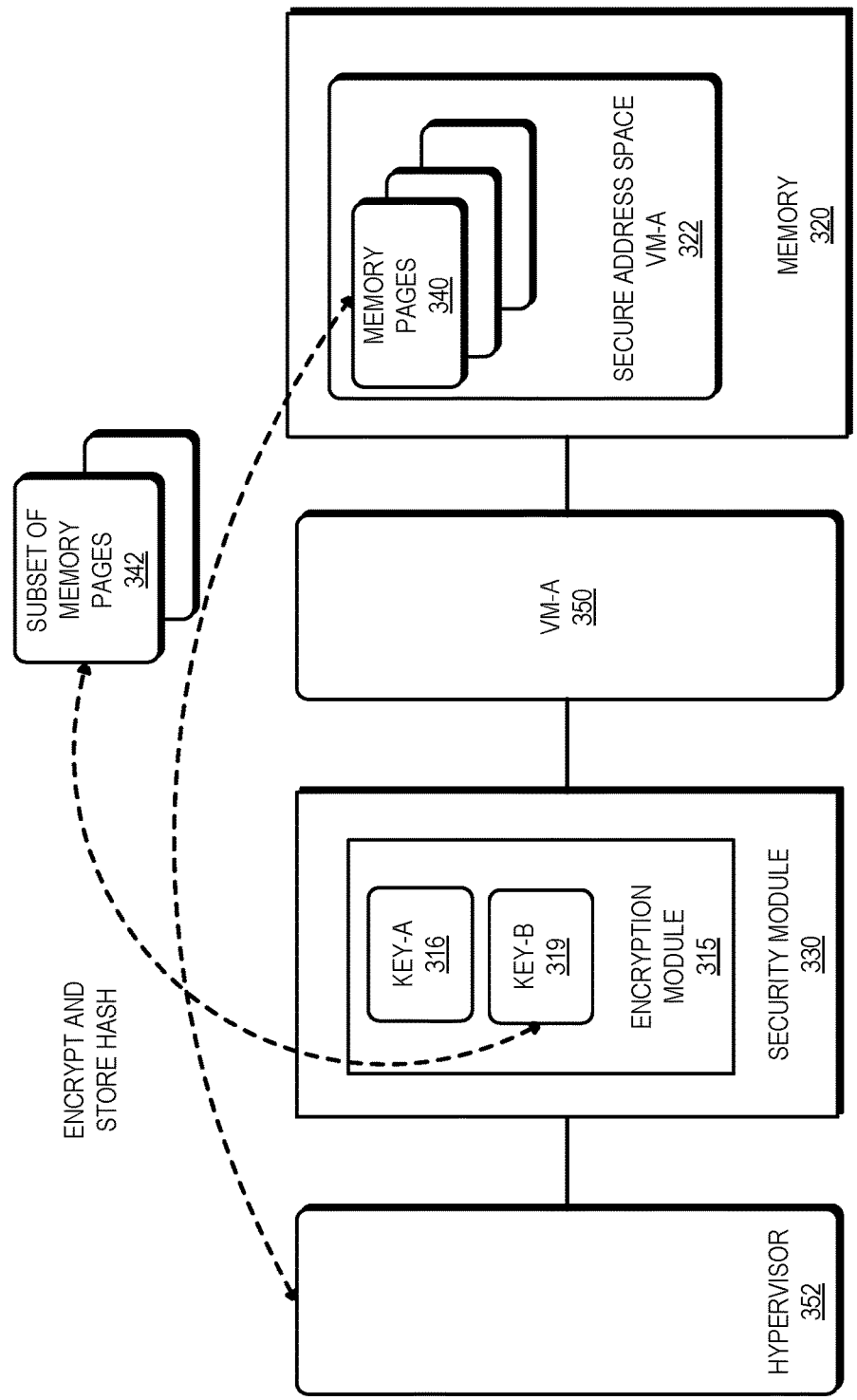
FIG. 3 is a block diagram illustrating an example of a security module of the processing system of FIG. 1 allocating to the hypervisor a subset of memory pages allocated to a VM in accordance with some embodiments.

FIG. 3 is a block diagram illustrating an example of a security module 330 of the processing system 100 of FIG. 1 allocating to the hypervisor 352 a subset 342 of memory pages 340 allocated to the VM-A 350 in accordance with some embodiments. In the depicted example, the security module 330 includes an encryption module 315. In some embodiments, the encryption module 315 may be separate from the security module 330.

At launch of the VM-A 350, the hypervisor 352 allocates memory pages 340 to the VM-A 350. Memory pages 340 are stored at a designated memory secure address space VM-A 322 of memory 320. The hypervisor 352 invokes the security module 330 to encrypt data that the VM-A 350 writes to the memory pages 340 using encryption Key-A 316 and to generate an offline encryption Key-B 319 uniquely associated with the VM-A 350. When the hypervisor 352 requests a subset 342 of memory pages 340, the security module 330 reads and decrypts the page data stored at the subset of memory pages 342, generates a nonce, and re-encrypts the page data using the offline encryption Key-B 319 that was generated when the VM was launched. The security module 330 calculates a hash of the nonce, re-encrypted data, and page meta-data, and stores the hash with a swap list (not shown) of pages swapped out by VM-A 350.

Figure 4:
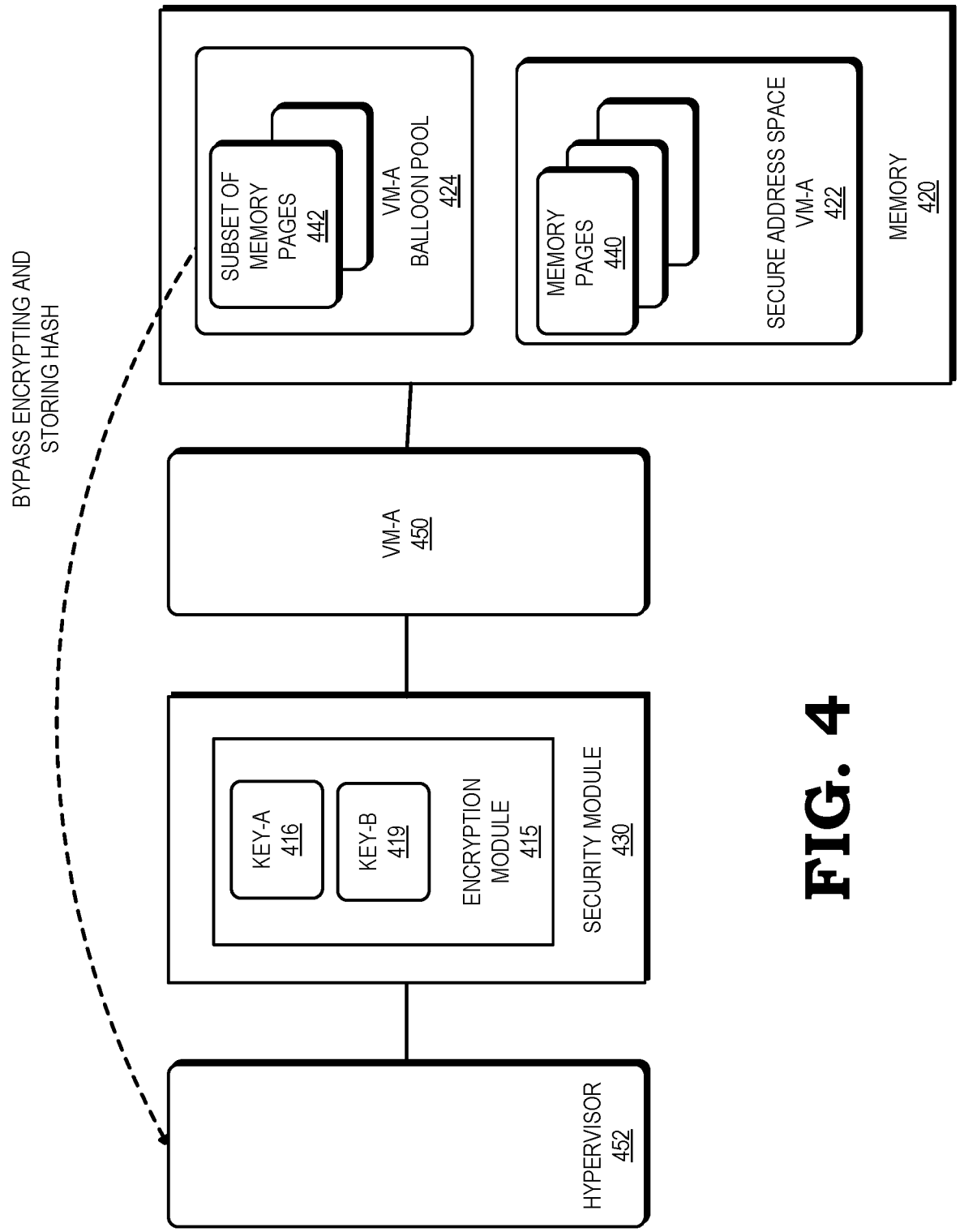
FIG. 4 is a block diagram illustrating an example of a security module of the processing system of FIG. 1 allocating to the hypervisor a subset of memory pages allocated to a balloon pool of a VM in accordance with some embodiments.

FIG. 4 is a block diagram illustrating an example of a security module 430 of the processing system 100 of FIG. 1 allocating to the hypervisor 452 a subset of memory pages 442 allocated to a balloon pool 424 of the VM-A 450 in accordance with some embodiments. In the depicted example, the memory 420 includes a portion 422 designed for storing secure information of VM-A 450 and a balloon pool 424 allocated to VM-A 450 for storing excess memory pages that are not expected to be written to for a period of time, or that are considered less valuable by the VM-A 450.

When the hypervisor 452 requests the subset of memory pages 442 stored at the VM-A balloon pool 424, the security module 430 bypasses encrypting and calculating and storing a hash for the subset of memory pages 442. Because the subset of memory pages 442 is either unused or considered less valuable by the VM-A 450, the hypervisor 452 may swap memory pages in and out of the VM-A balloon pool 424 without invoking protections of the security module 430 against modifications of the subset of memory pages 442.

Figure 5:
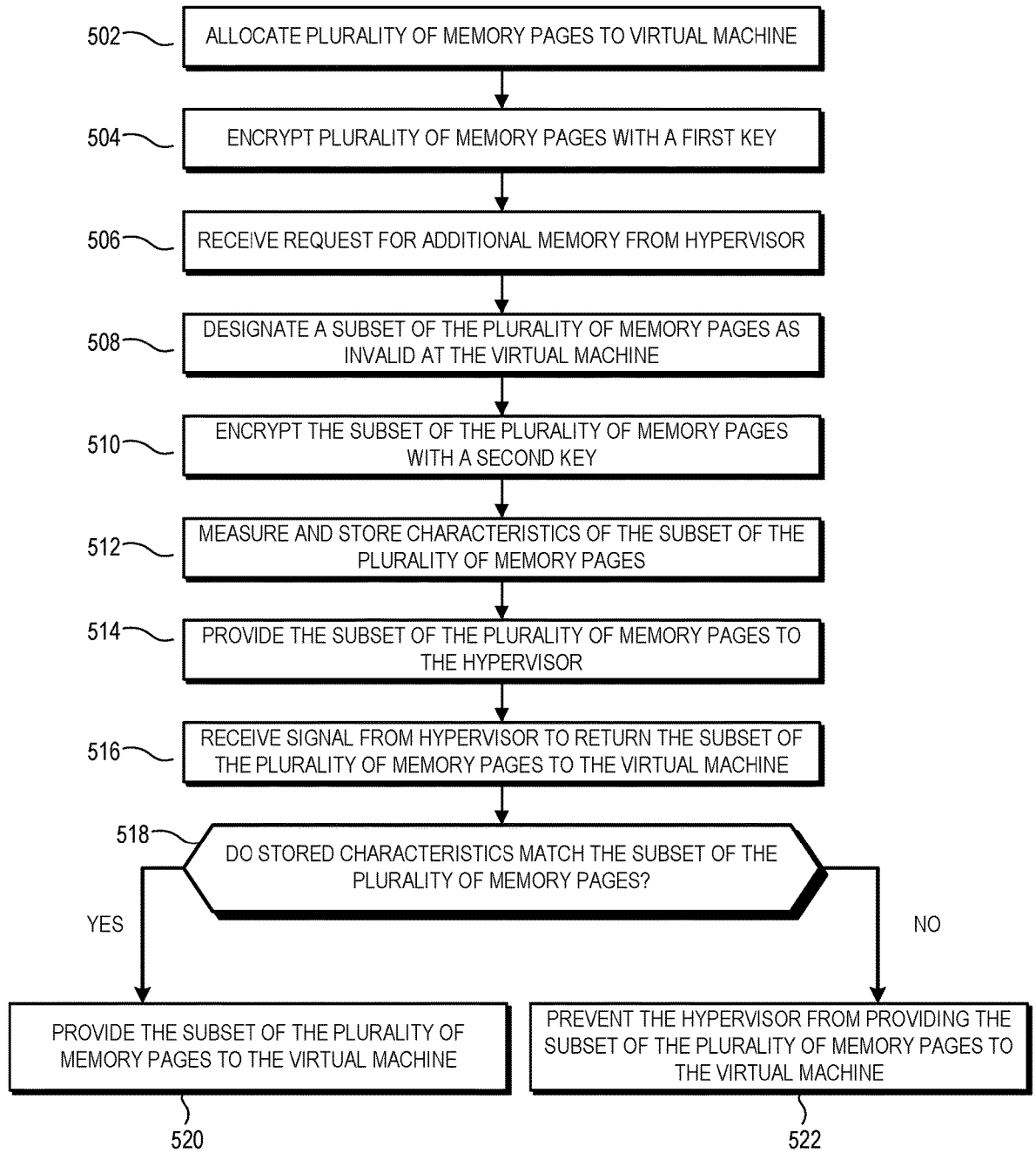
FIG. 5 is a flow diagram illustrating a method for verifying at a security module of the processing system of FIG. 1 the contents of a subset of memory pages allocated to a VM as it transitions between the VM and a hypervisor in accordance with some embodiments.

FIG. 5 is a flow diagram illustrating a method 500 for monitoring at a security module 130 of the processing system of FIG. 1 a subset of memory pages allocated to a VM-A 150 as it transitions between the VM-A 150 and a hypervisor 152 in accordance with some embodiments. At block 502, the hypervisor 152 allocates a plurality of memory pages to a virtual machine 150. At block 504, the encryption module 115 encrypts a plurality of memory pages written to by the VM-A 150 with a first key 116. At block 506, the security module 130 receives a request from the hypervisor 152 for a subset of the memory pages allocated to the VM-A 150. At block 508, the security module designates the requested subset of memory pages as invalid at the VM-A 150. At block 510, the security module encrypts the requested subset of memory pages with a second key. At block 512, the security module 130 measures and stores characteristics of the requested subset of memory pages. At block 514, the security module 130 provides the requested subset of memory pages to the hypervisor 152.

At block 516, the security module 130 receives a signal from the hypervisor 152 requesting to return the subset of memory pages to the VM-A 150. At block 518, the security module 130 compares the stored measured characteristics of the subset of memory pages to the characteristics of the memory pages that the hypervisor 152 is returning. If the stored measured characteristics of the subset of memory pages match the characteristics of the memory pages that the hypervisor 152 is returning, at block 520, the security module provides the subset of memory pages to the VM-A 150. If the stored measured characteristics of the subset of memory pages do not match the characteristics of the memory pages that the hypervisor 152 is returning, at block 522, the security module 130 prevents the hypervisor 152 from providing the subset of memory pages to the VM-A 150 by rejecting the request to swap in the subset of memory pages. In some embodiments, the security module 130 will deny a request to decrypt and re-encrypt with the VM-A 150's key the subset of memory pages in response to the stored measured characteristics not matching the characteristics of the memory pages that the hypervisor 152 is returning. In this way, the security module 130 prevents the hypervisor 152 from swapping in data encrypted with the VM-A 150's key by restricting the hypervisor 152's use of the VM-A 150's key to swap in. Thus, the security module 130 does not admit the subset of memory pages to return to the VM-A 150's domain of secure pages if the stored measured characteristics do not match the characteristics of the memory pages that the hypervisor 152 is attempting to return.

Figure 6:
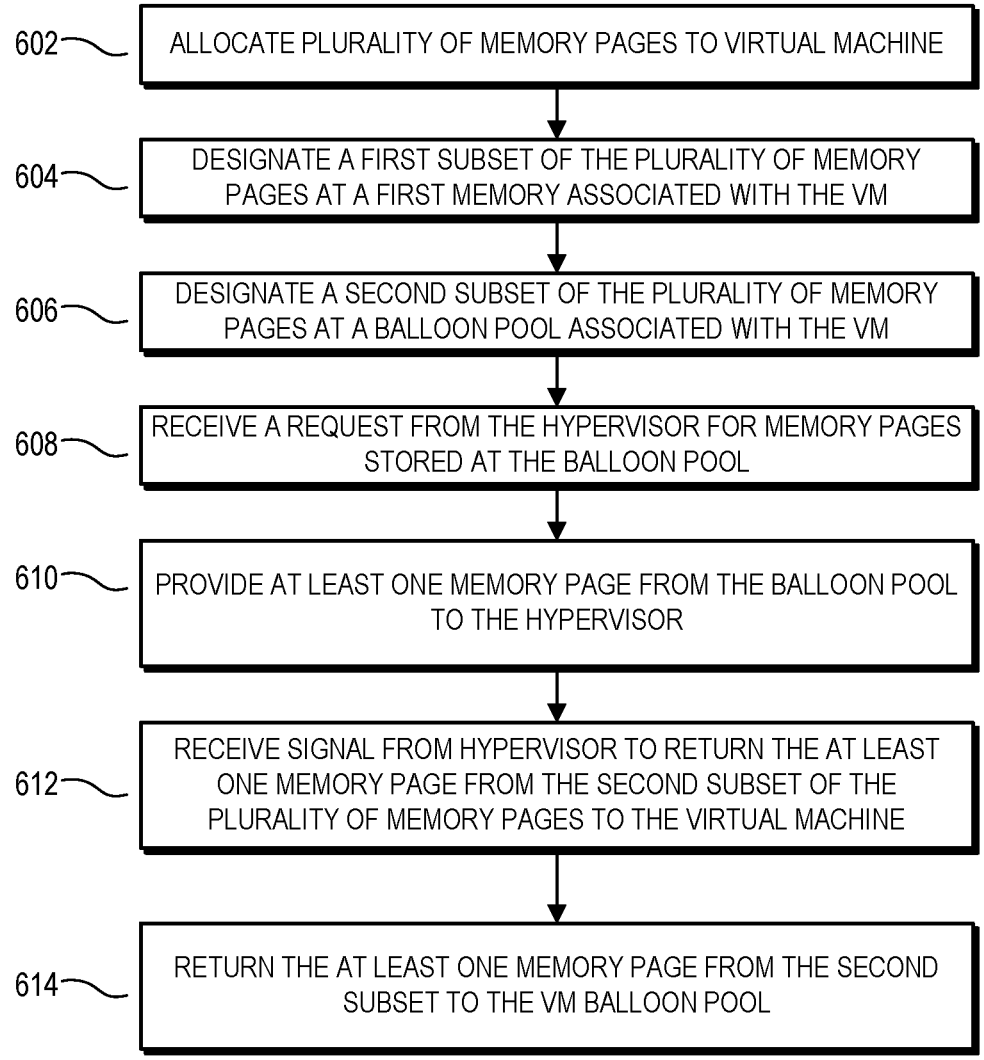
FIG. 6 is a flow diagram illustrating a method for allocating to a hypervisor a subset of memory pages allocated to a balloon pool of a VM in accordance with some embodiments.

FIG. 6 is a flow diagram illustrating a method 600 for allocating to a hypervisor 152 of the processing system 100 of FIG. 1 a subset of memory pages allocated to a balloon pool 124 of the VM-A 150 in accordance with some embodiments. At block 602, the hypervisor 152 allocates memory pages to the VM-A 150. At block 604, the hypervisor designates a first subset of the allocated memory pages at a first memory for secure address space 122 associated with the VM-A 150. At block 606, the hypervisor designates a second subset of the allocated memory pages at a balloon pool 124 associated with the VM-A 150. At block 608, the security module 130 receives a request from the hypervisor 152 for memory pages from the balloon pool 124. At block 610, the security module 130 provides at least one memory page from the balloon pool 124 to the hypervisor 152. At block 612, the security module 130 receives a signal from the hypervisor 152 to return the at least one memory page to the VM-A 150. At block 614, the security module 130 returns the at least one memory page to the VM balloon pool 124.

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium may include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
 transitioning at least one memory page from a first virtual machine executing at a processor to a first hypervisor executing at the processor;
 receiving, at a security module of the processor, a request from the first hypervisor to return the at least one memory page to the first virtual machine;
 selectively verifying at the security module of the processor the contents of the at least one memory page in response to the request to return the at least one memory page from the first hypervisor to the first virtual machine;

bypassing verifying the contents of the at least one memory page in response to the first hypervisor requesting to return the at least one memory page, in response to the at least one memory page being allocated to a balloon pool associated with the first virtual machine to hold memory pages not anticipated to be written to by the first virtual machine; and providing the at least one memory page to the first virtual machine in response to verifying the contents of the at least one memory page or in response to the at least one memory page being allocated to the balloon pool associated with the first virtual machine.

2. The method of claim 1, wherein selectively verifying the contents of the at least one memory page comprises:

measuring at least one characteristic of the at least one memory page to generate at least one characteristic measurement in response to the at least one memory page transitioning from the first virtual machine to the first hypervisor;

storing the at least one characteristic measurement at the security module; and comparing the at least one characteristic measurement to the at least one memory page in response to the first hypervisor returning the at least one memory page.

3. The method of claim 2, further comprising:

preventing the first hypervisor from providing the at least one memory page to the first virtual machine in response to the at least one characteristic measurement not matching the at least one memory page.

4. The method of claim 1, further comprising:

allocating a plurality of memory pages to the first virtual machine;

storing a first subset of the plurality of memory pages at the balloon pool associated with the first virtual machine, wherein the first subset comprises memory pages that are not anticipated to be written to by the first virtual machine in a first time period; and providing at least one page of the first subset of the plurality of memory pages to the first hypervisor in response to the first hypervisor requesting at least one memory page.

5. The method of claim 4, further comprising:

bypassing verifying the contents of the at least one page of the first subset of memory pages from the first hypervisor to the first virtual machine in response to the first hypervisor requesting to return the at least one page of the first subset of memory pages to the balloon pool associated with the first virtual machine.

6. The method of claim 1, wherein further comprising:

allocating a plurality of memory pages to the first virtual machine;

designating a subset of the plurality of memory pages as invalid in response to a request by the first hypervisor for at least one memory page; and providing the subset of the plurality of memory pages to the first hypervisor.

7. The method of claim 6, further comprising:

measuring at least one characteristic of the subset of the plurality of memory pages to generate at least one characteristic measurement;

storing the at least one characteristic measurement at the security module;

comparing the at least one characteristic measurement to the subset of the plurality of memory pages in response to the first hypervisor returning the subset of the plurality of memory pages; and providing the subset of the plurality of memory pages to the first virtual machine in response to the at least one characteristic measurement matching the subset of the plurality of memory pages.

8. The method of claim 6, further comprising:

encrypting the plurality of memory pages with a first key; and encrypting the subset of the plurality of memory pages with a second key.

9. The method of claim 8, wherein the second key is generated in response to the plurality of memory pages being allocated to the first virtual machine.

10. A method, comprising:

transitioning a first memory page from a first virtual machine executing at a processor to a first hypervisor executing at the processor;

in response to the first hypervisor requesting to return the first memory page to the first virtual machine, selectively verifying, at a security module of the processor, that the contents of the first memory page that the first hypervisor is requesting to return match the contents of the first memory page that was transitioned from the first virtual machine to the first hypervisor;

bypassing verifying that the contents of the first memory page that the first hypervisor is requesting to return match the contents of the first memory page that was transitioned from the first virtual machine to the first hypervisor, in response to the first memory page being allocated to a balloon pool associated with the first virtual machine to hold memory pages not anticipated to be written to by the first virtual machine; and providing the first memory page to the first virtual machine in response to verifying that the contents of the first memory page that was transitioned from the first virtual machine to the first hypervisor match the contents of the first memory page that the first hypervisor is requesting to return or in response to the first memory page being allocated to the balloon pool associated with the first virtual machine.

11. The method of claim 10, wherein selectively verifying the contents of the first memory page comprises:

measuring at least one characteristic of the first memory page to generate at least one characteristic measurement in response to the first memory page transitioning from the first virtual machine to the first hypervisor;

storing the at least one characteristic measurement at the security module; and comparing the at least one characteristic measurement to the first memory page in response to the first hypervisor returning the first memory page.

12. The method of claim 11, further comprising:

rejecting a request from the first hypervisor to return the first memory page to the first virtual machine in response to the at least one characteristic measurement not matching the first memory page.

13. The method of claim 10, further comprising:

allocating a plurality of memory pages to the first virtual machine;

storing a first subset of the plurality of memory pages at the balloon pool associated with the first virtual machine, wherein the first subset comprises memory pages that have not been written to by the first virtual machine; and providing at least one page of the first subset of the plurality of memory pages to the first hypervisor in response to the first hypervisor requesting at least one memory page.

14. The method of claim 13, further comprising:
bypassing verifying the contents of the at least one page of the first subset of memory pages in response to the at least one page of the first subset of memory pages transitioning from the first hypervisor to the first virtual machine further in response to the first hypervisor providing the at least one page of the first subset of memory pages to the balloon pool associated with the first virtual machine.

15. The method of claim 10, further comprising:
allocating a plurality of memory pages to the first virtual machine;
designating a subset of the plurality of memory pages as invalid in response to a request by the first hypervisor for at least one memory page; and
providing the subset of the plurality of memory pages to the hypervisor.

16. The method of claim 15, further comprising:
measuring at least one characteristic of the subset of the plurality of memory pages to generate at least one characteristic measurement;
storing the at least one characteristic measurement at the security module;
comparing the at least one characteristic measurement to the subset of the plurality of memory pages in response to the first hypervisor returning the subset of the plurality of memory pages; and
providing the subset of the plurality of memory pages to the first virtual machine in response to the at least one characteristic measurement matching the subset of the plurality of memory pages.

17. The method of claim 15, further comprising:
encrypting the plurality of memory pages with a first key; and
encrypting the subset of the plurality of memory pages with a second key.

18. A processor, comprising:
a first virtual machine;
a first hypervisor; and
a security module to:
selectively verify that the contents of a first memory page that has transitioned from the first virtual machine to the first hypervisor match the contents of the first memory page that the first hypervisor requests to return to the first virtual machine in response to receiving a request from the first hypervisor to return the first memory page to the first virtual machine;
bypass verifying that the contents of the first memory page that the first hypervisor is requesting to return match the contents of the first memory page that was transitioned from the first virtual machine to the first hypervisor, in response to the first memory page being allocated to a balloon pool associated with the first virtual machine to hold memory pages not anticipated to be written to by the first virtual machine; and
provide the first memory page to the first virtual machine in response to verifying that the contents of the first memory page that was transitioned from the first virtual machine to the first hypervisor match the contents of the first memory page that the first hypervisor is requesting to return or in response to the first memory page being allocated to the balloon pool associated with the first virtual machine.

19. The processor of claim 18, wherein the security module is to selectively verify the contents of the first memory page by:
measuring at least one characteristic of the first memory page to generate at least one characteristic measurement in response to the first memory page transitioning from the first virtual machine to the first hypervisor;
storing the at least one characteristic measurement at the security module; and
comparing the at least one characteristic measurement to the first memory page in response to the first hypervisor requesting to return the first memory page.

20. The processor of claim 19, wherein the security module is further to:
reject the request from the first hypervisor to return the first memory page to the first virtual machine in response to the at least one characteristic measurement not matching the first memory page.

21. The processor of claim 18, wherein the security module is further to:
allocate a plurality of memory pages to the first virtual machine;
store a first subset of the plurality of memory pages at the balloon pool associated with the first virtual machine, wherein the first subset comprises memory pages that have not been written to by the first virtual machine; and
provide at least one page of the first subset of the plurality of memory pages to the first hypervisor in response to the first hypervisor requesting at least one memory page.

22. The processor of claim 21, wherein the security module is further to:
bypass verifying the contents of the at least one page of the first subset of memory pages in response to the first hypervisor providing the at least one page of the first subset of memory pages to the balloon pool associated with the first virtual machine.

23. The processor of claim 18, wherein the security module is further to:
allocate a plurality of memory pages to the first virtual machine;
designate a subset of the plurality of memory pages as invalid in response to a request by the first hypervisor for at least one memory page; and
provide the subset of the plurality of memory pages to the hypervisor.

24. The processor of claim 23, wherein the security module is further to:
measure at least one characteristic of the first memory page to generate at least one characteristic measurement;
store the at least one characteristic measurement at the security module;
compare the at least one characteristic measurement to the first memory page in response to the first hypervisor requesting to return the first memory page; and
provide the first memory page to the first virtual machine in response to the at least one characteristic measurement matching the first memory page.

25. The processor of claim 23, wherein the security module is further to:
encrypt the plurality of memory pages with a first key; and
encrypt the subset of the plurality of memory pages with a second key.

* * * * *